United States Patent

Shaw

[15] 3,672,302
[45] June 27, 1972

[54] ELECTRONIC DIGITAL ACCELEROMETER, FUZE, OR SAFETY AND ARMING MECHANISM

[72] Inventor: Donald N. Shaw, Mountain Lakes, N.J.
[73] Assignee: The United States of America as represented by the Secretary of the Army
[22] Filed: April 27, 1970
[21] Appl. No.: 31,960

[52] U.S. Cl. ..................................................102/70.2 R
[51] Int. Cl..................F42c 11/06, F42c 15/24, F42c 15/40
[58] Field of Search..................................343/8; 102/70.2 P

[56] References Cited

UNITED STATES PATENTS 3,478,356  11/1969  Divine ........................................343/8

Primary Examiner—Benjamin A. Borchelt
Assistant Examiner—Thomas H. Webb
Attorney—Harry M. Saragovitz, Edward J. Kelly and Herbert Berl

[57] ABSTRACT

Electrical apparatus comprises an oscillator or clock to feed pulses through an initiate gate to a digital X-bit counter. The counter is normally maintained at a zero level, or empty state, in condition to receive and temporarily store a maximum number of pulses, by a normally closed switch in an input line. And, pulses normally are not fed to the counter due to an open switch in an input line to the initiate gate. Upon acceleration of the apparatus the normally open switch closes to actuate the initiate gate, and the normally closed switch opens to permit the counter to begin counting or storing pulses therein. When the number of pulses reaches a predetermined value after a predetermined time delay, the counter fires off a signal to an output line. This signal may be used directly to trigger actuation of another device or apparatus. Or, the signal may be fed into an output gate which will pass the signal to the apparatus only upon the application of another signal or pulse to the output gate.

The signal from the output line, or from the output gate, may be used to actuate explosive apparatus or to arm other devices.

7 Claims, 3 Drawing Figures

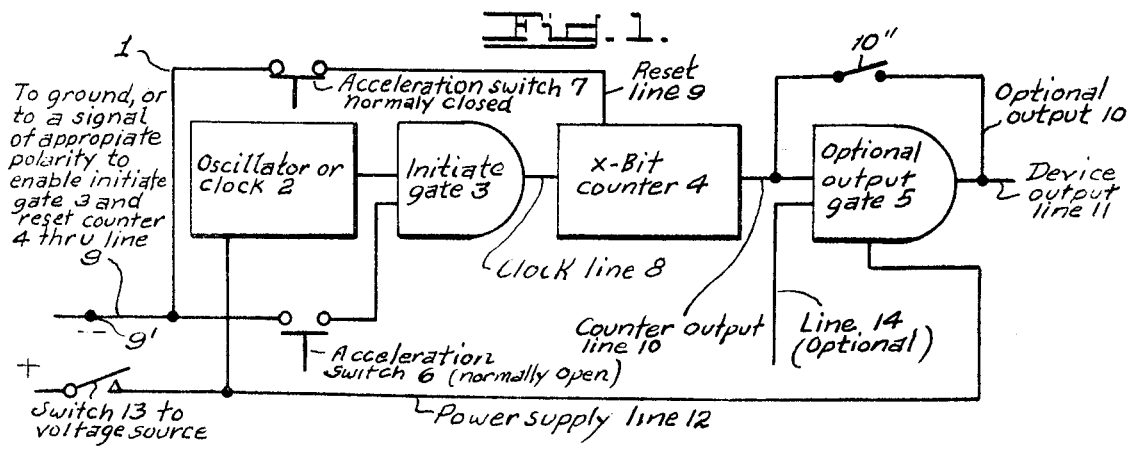
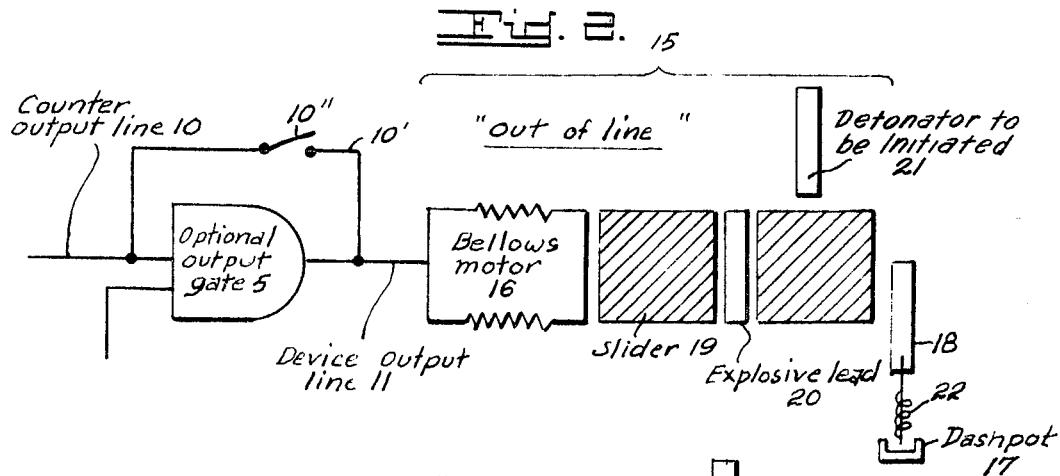
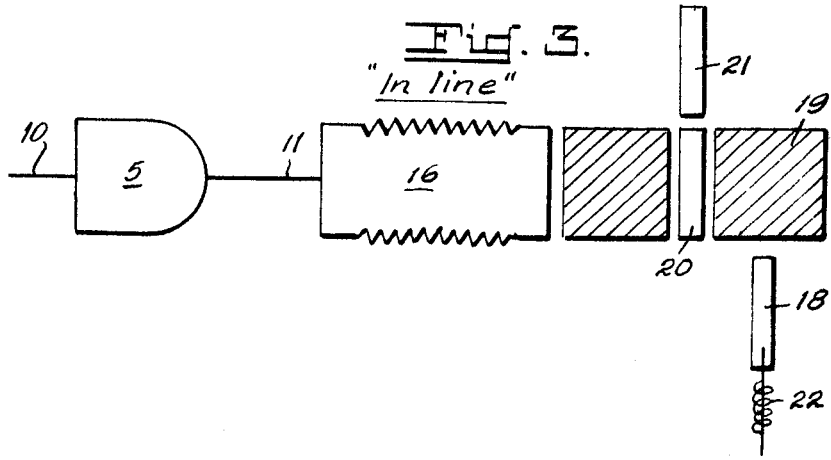

ELECTRONIC DIGITAL ACCELEROMETER, FUZE, OR SAFETY AND ARMING MECHANISM

The invention described herein may be manufactured, used, and licensed by or for the Government for governmental purposes without the payment to me of any royalty thereon.

BRIEF SUMMARY

In ordnance devices there is a widespread use of safety and arming mechanisms. Such mechanisms are used to measure acceleration, spin, or other environments, and to subsequently permit arming of a system at a safe distance from a firing site. Arming is often accomplished by moving an explosive element from an out-of-line to an in-line position, or by removing a blocking shutter from the explosive path, thereby completing a path for propagation of an explosion.

Such safety and arming devices include one or more accelerometers to measure acceleration, timers to delay arming, spin sensors to measure spin, pull pins, and other safety techniques which control the alignment of the explosive elements. Similarly, accelerometers, timers and spin sensors themselves are frequently used in ordnance and other fields of endeavor for reasons other than directly arming an explosive train. Each has the common purpose of measuring and responding to a given level of environment.

The various prior art devices have included mechanical and electromechanical systems. Most mechanical and electromechanical systems employ spring-mass systems, timing escapement and gear trains. These devices inherently require moving parts, extensive watch making skill, extensive tooling which must be maintained and replaced, and high precision calibration, and adjustment necessary to achieve reliability with complex mechanisms. Once designed, extensive redesign is usually required for even minor changes in performance requirements. Frequently excessive size or weight penalties are encountered, or excessive costs prevail. Little if any standardization has been possible for the wide range of sizes required. In addition, in the electromechanical systems, the acceleration sensing devices have been basically analogue type devices (such as crystals, oscillators, etc.) emitting a basic signal proportional to (or the analogue of) the acceleration being measured. Such devices are characterized by variations in calibration due to temperature, aging, manufacturing tolerances, and circuit effects of other circuits connected thereto.

Thus, although the art of safety and arming devices and accelerometers is widespread, many practical problems exist, due in large measure to the large numbers of moving parts, as well as the need for the complex interconnection and interrelation of these parts.

Accordingly, it is an object of this invention to provide a digital type accelerometer, fuze, and/or safety and arming arrangement which employs digital logic to reduce the dependency on calibration of analogue type devices, and to provide a logic arrangement highly compatible with minimizing the number of electrical components thru use of integrated circuits, thereby minimizing the number of moving parts and other components when compared with prior art systems.

Another object of this invention is to provide a digital logic arrangement, system and mechanism which when used in conjunction with accessory devices thereto, and when used as, or in, either an accelerometer, fuze, or a safety and arming device, will provide a signal indicating that a minimum specified level of acceleration has been applied to the system for a minimum specified time period, or which completes its arming cycle after receiving minimum acceleration for a minimum time period, and which resets to zero and does not provide said signal if the acceleration falls to less than the minimum value before the specified minimum time has elapsed.

Another object of this invention is to provide an accelerometer, fuze, or safety and arming mechanism or system with an added safety feature of requiring simultaneous presence of at least two stimuli, voltage and acceleration, for operation.

Another object of this invention is to provide an electronic digital device which will eliminate mechanical escapements and moving parts from timers and integrators used in mechanical accelerometers, fuzes or safety and arming mechanisms, which eliminates gears from any part of the device, which is relatively simple, and therefore easily and cheaply constructed.

Another object is to provide a means for changing the calibration of the "g" level of response or the prescribed time duration by changing or replacing only one part which is not mechanically connected to any other moving part, thereby eliminating the need for changing dimensions or tolerances of other moving components when a calibration change is required.

Generally described, this invention comprises a digital logic system consisting of, but not necessarily limited to, an oscillator, one or more digital gates, a digital counter, and two acceleration switches. The first acceleration switch is a normally open switch which closes at a pre-calibrated minimum value of acceleration. When closed, this switch connects or gates the oscillator to the input or clock-pulse line of the counter. After being connected to the oscillator the counter stores pulses; upon receiving a prescribed number of pulses which corresponds to the specified minimum time of duration of acceleration, the counter provides an output signal.

The second acceleration switch is a normally closed switch which is connected to the "reset" line of the counter. This switch opens upon sensing a precalibrated minimum value of acceleration. Its function is to "reset" or "zero" the counter upon application of voltage, and also to prevent operation until acceleration appears, even in the event of accidental closure of the first normally open acceleration switch. Once the switch opens, the counter is rendered capable of counting. Another function of this second, normally closed switch is to reset and disable the counter in the event of removal of acceleration prior to the minimum specified time of acceleration.

In addition to the foregoing, the system comprises a voltage source which must be turned on or applied to the circuit to enable the system to operate. Thus, if the system is dropped or accelerated without the presence of voltage, no response can occur even though acceleration is experienced which is within the design range of the device.

As an accelerometer or fuze, the above is essentially a complete system. For use as a Safety and Arming Mechanism, a movable rotor, containing an explosive detonator or initiator, is added to the system. This rotor would be capable of being driven, or moved, by the output of the counter, thereby aligning the explosive elements into a position which will permit warhead detonation by command of some other fuzing stimuli.

DRAWINGS

FIG. 1 is a schematic or logic diagram of an accelerometer embodying the invention;

FIG. 2 is a schematic or logic diagram of apparatus added to FIG. 1 rendering the invention useful as a safety and arming mechanism;

FIG. 3 illustrates components of FIG. 2 in a different position.

Referring now specifically to the drawing, FIG. 1 illustrates the digital amorphous or fuze device 1 constructed in accordance with this invention. The device 1 consists of an oscillator or clock 2, an initiate gate 3, an X-bit counter or digital divider 4, an optional output gate 5, a normally open acceleration switch 6, and a normally closed acceleration switch 7. The X-bit counter 4 contains a clockline 8, a reset line 9 and a counter output line 10. An output signal (after the proper sequence of events has occurred) may be obtained from either the output line 11 through the optional output gate 5 or directly from the counter output line 10 through optional line 10' and switch 10''. All components are connected to the power supply line 12. Switch 13 controls application of voltage to the system.

OPERATION OF FIG. 1

Switch 13 maintains overall control of the system; if no voltage is applied, the closure of switch 6 and opening of switch 7 due to acceleration has no effect on the overall system. Switch 13 may not exist as such but analogous control may be achieved through utilization of a reserve type battery or power supply which is activated by an electrical or a mechanical signal and subsequently applies voltage to the system.

After application of voltage, the oscillator 2 produces output pulses at a fixed frequency. The pulses are applied to one of the input lines of initiate gate 3. Initiate gate 3 is a commonly used And or Nor type gate which requires the simultaneous presence of signals of the same polarity on both input lines in order for a signal to be transmitted thru the gate. With application of only the oscillator signal, or only the closure of switch 6, the gate 3 cannot pass signals to the counter 4. Upon closure of the acceleration switch 6 and simultaneous application of an oscillator pulse, gate 3 will transmit a pulse to the X-bit counter.

Thus, acceleration controls application of pulses to the counter. Pulses are received at the counter clock line 8 only when acceleration is present and has closed switch 6.

The X-bit counter consists of a digital counter or divider which will count pulses applied to the clock line 8. When X number of pulses have been received on the clock line 8 an output signal will be provided on counter output line 10. The reset line 9 of the X-bit counter sets or clears the counter to a "zero" state (i.e., a state where the counter is completely empty, or set for maximum capacity) when switch 7 is closed and the reset line is grounded at 9', or when an appropriate signal source is applied at 9' to reset counter 4 to zero.

It will be apparent to those skilled in the art that there are a number of types of digital counters which can be used within the scope and spirit of this invention; that X can assume any integer value; that the counter can be designed to be disabled from counting whenever a voltage is applied to the reset line 9, even though pulses are applied to the clock line 8; or, alternatively the counter can be designed to reset to zero but then be capable of counting even though the reset voltage remains on the reset line 9; and that a number of other variations can be introduced that are within the scope and spirit of this invention.

For purposes of simplifying further description of the device, it is assumed that the reset circuit is designed to both reset and disable the counter. Then, while closed, the normally closed acceleration switch 7 performs the function of resetting the counter to zero as soon as voltage is applied to the system. Upon application of acceleration, switch 7 opens, thereby removing voltage from reset line 9. The X-bit counter is in the zero state at this instant, and is now able to receive a count and store pulses received on the clock line 8. If at any time acceleration is removed, switch 7 will close and immediately reset the counter to zero, and disable it.

Assuming now that voltage has been applied to the system, and the counter 4 has been reset to zero, then, when acceleration is applied to the system, switch 6 closes and switch 7 opens. The counter now receives, accepts, and stores pulses from the initiate gate. If acceleration is applied for a sufficient time period to allow the counter to be filled, an output pulse will then be supplied to output line 10. As an example, assume that the oscillator 2 provides pulses at a frequency of 10 cycles per second, and that the counter 4 requires 10 pulses to fill up and provide an output. Then, an output will be provided after receiving 10 pulses, i.e., after acceleration has been applied for 0.9 seconds assuming that the first pulse applied to the counter occurs at time zero. The system will function even though acceleration exceeds the minimum response level of acceleration switches 6 and 7, but will not operate faster if acceleration is increased above the minimum level. Thus, the output signal indicates that a minimum (or greater) level of acceleration has been applied for a minimum prescribed time period.

Assume now that the system has been started as in the preceding paragraph, i.e., acceleration has been applied and the counter is receiving pulses. If, prior to the time required for the counter to fill up, the acceleration is removed, or reduces below the closing and opening thresholds of the acceleration switches 6 and 7, switch 6 opens and switch 7 closes. As a result of switch 6 opening, gate 3 disables and no additional pulses are applied to counter 4. As a result of switch 7 closing, counter 4 is reset to zero, i.e., to the empty state, losing whatever number of pulses had been put into the counter during acceleration. Moreover, X-bit counter 4 remains disabled while switch 7 is closed.

The output from counter 4 may be routed directly to output line 11 via optional output line 10' controlled by switch 10'' if desired. Optionally, the output from counter 4 may be fed into output gate 5 which blocks the output until a signal is fed to gate 5 via line 14.

FIG. 2 shows a modification wherein an alignment mechanism 15 has been added as required in a Safety and Arming Device. This alignment mechanism basically interrupts the explosive train leading to the main warhead, thus preventing warhead detonation even though sensitive detonators may explode prematurely. As the apparatus is accelerated upwardly in FIG. 2, inertial force on set-back safety pin 18 overcomes the force of spring 22 and dashpot 17 and pin 18 drops back to the position illustrated in FIG. 3. This permits motor 16 to push slider 19 to the right to a position where explosive lead 20 lines up with detonator 21. Optional line 14 may be used, which requires a signal before providing an output from gate 5 to require that one or more other signals be provided in conjunction with the output of the X-bit counter in order to permit arming. A signal may be supplied to line 14 to trigger output gate 5 when the apparatus reaches a predetermined altitude, or when it strikes a target, or when it comes into proximity with a target, or when some other specified requirement is met.

What I claim and desire to protect by Letters Patent is:

1. Ordnance apparatus for use with a normally closed acceleration responsive control switch and a normally open acceleration responsive control switch comprising a source of electrical power having a plurality of terminals, oscillator means connected to a first terminal of said source of power, an initiate gate connected to said oscillator means, an X-bit counter connected to said initiate gate, first means connecting a second terminal of said source of power to said X-bit counter through the normally closed acceleration responsive control switch to maintain said X-bit counter set to zero or to reset said counter to zero when the switch is closed and to permit said X-bit counter to accumulate pulses coming through said oscillator when said switch is open, second means connecting said second terminal of said source of power to said initiate gate through the normally open acceleration responsive control switch to activate said initiate gate when acceleration closes the normally open switch to permit said initiate gate to pass pulses coming simultaneously from said oscillator and said last mentioned switch, said X-bit counter producing an output signal upon the accumulation of a predetermined number of pulses from said initiate gate.

2. Apparatus as in claim 1 and an output gate connected to the output of said X-bit counter, and an input line to enable said output gate responsive to a signal fed to said input line, the output gate blocking transmission from said X-bit counter until a signal is supplied by said input line and permitting transmission when a signal is supplied by said input line.

3. Apparatus as in claim 2 and a by-pass line and switch to permit a signal from said X-bit counter to by-pass said output gate.

4. Apparatus as set out in claim 1 and motor means actuable in response to an output signal from said X-bit counter tending to arm an explosive device.

5. Apparatus as set out in claim 2 and motor means actuable in response to an output signal from said output gate tending to arm an explosive device.

6. Apparatus as in claim 4 and means preventing arming of said explosive device prior to acceleration thereof of a predetermined magnitude.

7. Apparatus as in claim 6 wherein said last mentioned means comprises safety pin locking means urged to a position to prevent arming and withdrawable in response to acceleration to permit arming.

* * * * *